US011540091B2

(12) United States Patent
Sangameshwara et al.

(10) Patent No.: US 11,540,091 B2
(45) Date of Patent: Dec. 27, 2022

(54) OPTIMIZING NETWORK RESOURCES USAGE BY DYNAMICALLY CONTROLLING MEDIA BURSTS IN SIMULTANEOUS PUSH TO TALK OVER CELLULAR (POC) CALLS

(71) Applicant: Samsung Electronics Co., Ltd., Suwon-si (KR)

(72) Inventors: Vijay Sangameshwara, Bangalore (IN); Siva Prasad Gundur, Bangalore (IN); Sapan Pramodkumar Shah, Bangalore (IN); Naveen Devanahalli Balakrishna, Bangalore (IN); Srinivasa Rao Adusumilli, Bangalore (IN); Bhargav Madishetty, Bangalore (IN); Tushar Dutta, Bangalore (IN); Karthik Narayanan, Bangalore (IN)

(73) Assignee: Samsung Electronics Co., Ltd., Suwon-si (KR)

( * ) Notice: Subject to any disclaimer, the term of this patent is extended or adjusted under 35 U.S.C. 154(b) by 96 days.

(21) Appl. No.: 17/044,802

(22) PCT Filed: May 3, 2019

(86) PCT No.: PCT/KR2019/005381
§ 371 (c)(1),
(2) Date: Oct. 1, 2020

(87) PCT Pub. No.: WO2019/212316
PCT Pub. Date: Nov. 7, 2019

(65) Prior Publication Data
US 2021/0392470 A1 Dec. 16, 2021

(30) Foreign Application Priority Data

May 3, 2018 (IN) .............................. 201841016850
May 3, 2019 (IN) .............................. 201841016850

(51) Int. Cl.
*H04W 4/10* (2009.01)
*H04W 76/50* (2018.01)
(Continued)

(52) U.S. Cl.
CPC ............... *H04W 4/10* (2013.01); *H04W 4/12* (2013.01); *H04W 76/45* (2018.02); *H04W 76/50* (2018.02)

(58) Field of Classification Search
CPC .... H04W 4/10; H04W 76/45; H04L 65/4061; H04L 65/1016; H04L 65/1006
See application file for complete search history.

(56) References Cited

U.S. PATENT DOCUMENTS

2007/0112914 A1 5/2007 Sung et al.
2007/0258477 A1 11/2007 Huh
(Continued)

FOREIGN PATENT DOCUMENTS

KR 10-2008-0028636 A 4/2008
WO 2007/114616 A1 10/2007

OTHER PUBLICATIONS

Supplementary European Search Report dated Mar. 15, 2021 in connection with European Application No. 19796000.8, 9 pages.
(Continued)

*Primary Examiner* — Jamal Javaid (57) ABSTRACT

Optimal network resource consumption by dynamically controlling media bursts in Simultaneous PoC (Push-To-X (Push-To-Voice/Video/etc.) Over Cellular) calls. Embodiments disclosed herein relate to wireless communication networks, and more particularly to PoC calls performed using wireless communication networks. Embodiments herein disclose methods and systems for optimal network resource consumption by dynamically controlling media bursts, when a user is participating in simultaneous PoC
(Continued)

sessions. Embodiments herein disclose methods and systems for optimal network resource consumption by enabling a user to selectively enable/disable multiple PoC sessions using MBCP "Activate" and "Deactivate" messages.

9 Claims, 8 Drawing Sheets

(51) Int. Cl.
  *H04W 76/45* (2018.01)
  *H04W 4/12* (2009.01)

(56) References Cited

U.S. PATENT DOCUMENTS

| | | | |
|---|---|---|---|
| 2008/0076403 | A1 | 3/2008 | Park et al. |
| 2008/0155055 | A1* | 6/2008 | Shan ............... H04L 12/14 709/217 |
| 2008/0253321 | A1* | 10/2008 | Gormley ............ H04W 28/20 370/329 |
| 2011/0231558 | A1 | 9/2011 | Holm |
| 2013/0155875 | A1 | 6/2013 | Ayyasamy et al. |
| 2014/0348066 | A1 | 11/2014 | Patel et al. |
| 2015/0215356 | A1 | 7/2015 | Kalburgi et al. |
| 2017/0231014 | A1* | 8/2017 | Patel ................. H04W 76/45 |

OTHER PUBLICATIONS

"LTE; Mission Critical Video (MCVideo) signalling control; Protocol specification (3GPP TS 24.281 version 14.0.0 Release 14)", ETSI TS 124 281 V14.0.0 (Jul. 2017), 273 pages.

"3rd Generation Partnership Project; Technical Specification Group Core Network and Terminals; Mission Critical Push To Talk (MCPTT) call control; Protocol specification (Release 16)", 3GPP TS 24.379 V16.5.0 (Jun. 2020), 614 pages.

"3rd Generation Partnership Project; Technical Specification Group Core Network and Terminals; Mission Critical Push To Talk (MCPTT) media plane control; Protocol specification (Release 16)", 3GPP TS 24.380 V16.5.0 (Jun. 2020), 273 pages.

"3rd Generation Partnership Project; Technical Specification Group Core Network and Terminals; Mission Critical Video (MCVideo) media plane control; Protocol specification (Release 16)", 3GPP TS 24.581 V16.5.0 (Jun. 2020), 201 pages.

International Search Report dated Aug. 7, 2019 in connection with International Patent Application No. PCT/KR2019/005381, 3 pages.

Written Opinion of the International Searching Authority dated Aug. 7, 2019 in connection with International Patent Application No. PCT/KR2019/005381, 5 pages.

Examination report under sections 12 & 13 of the Patents Act, dated May 11, 2021, in connection with Indian Patent Application No. 201841016850, 6 pages.

\* cited by examiner

OPTIMIZING NETWORK RESOURCES USAGE BY DYNAMICALLY CONTROLLING MEDIA BURSTS IN SIMULTANEOUS PUSH TO TALK OVER CELLULAR (POC) CALLS

CROSS-REFERENCE TO RELATED APPLICATIONS

This application is a 371 of International Application No. PCT/KR2019/005381 filed on May 3, 2019, which claims priority to Indian Provisional Patent Application No. 201841016850 filed on May 3, 2018, and Indian Complete Patent Application No. 201841016850 filed on May 3, 2019 in the Indian Intellectual Property Office, the disclosures of which are herein incorporated by reference in their entirety.

BACKGROUND

1. Field

Embodiments disclosed herein relate to wireless communication networks, and more particularly to PoC—Push-To-X (Push-To-Voice/Video/etc.) over Cellular calls performed using wireless communication networks.

2. Description of the Related Art

A Push to talk over Cellular (PoC) session is a Session Initiation Protocol (SIP) session established between a PoC client and a home PoC server containing at least one media stream bound to a media-floor control entity.

A simultaneous PoC session is a functionality whereby the PoC client can receive media from multiple PoC sessions. When the PoC client has simultaneous PoC sessions. Active sessions are the sessions where the PoC client wants to receive the media for listening or for recording. During such simultaneous PoC sessions, a user might be active or passive in different sessions.

Currently, in the simultaneous PoC sessions, the PoC server sends media packets to a User Equipment (UE) device associated with the PoC client, although the user may be passive on that session. Hence un-necessary network bandwidth & other critical resources are consumed by these passive sessions.

Dedicated services, such as Mission Critical services, require efficient usage of expensive Government-bought frequency spectrum. Further, in current systems, if the user wants to selectively keep multiple PoC sessions active & disable the rest, existing approaches requires individual signaling per session leading to more traffic on the Control Plane. There is no efficient option available to selectively enable/disable multiple PoC session(s).

SUMMARY

The principal object of the embodiments herein is to disclose methods and systems for optimal network bandwidth consumption by dynamically controlling media bursts, when a user is participating in a plurality of simultaneous PoC sessions.

Another object of the embodiments herein is to disclose methods and systems for optimal network bandwidth consumption by enabling a user to selectively enable or disable one or more PoC sessions using Media plane MBCP "Activate" and "Deactivate" messages.

Accordingly the embodiments herein provide a method for optimizing network resources in Push to Talk over Cellular (PoC) service in a user plane. A User Equipment (UE) sends one of a Media Bursts Control Protocol (MBCP) deactivation request and an MBCP activation request to a server. The server deactivates flow of data to an active session and retains floor messages to the active session, on receiving the deactivation request, the data being one of audio and video. The server activates flow of data to a passive session, on receiving the MBCP activation request.

Accordingly the embodiments herein provide a system for optimizing network resources in Push to Talk over Cellular (PoC) service in user plane. A User Equipment (UE) is configured to send one of a Media Bursts Control Protocol (MBCP) deactivation request and an MBCP activation request to a server. The server is configured to deactivate flow of data to an active session and retains floor messages to the active session, on receiving the MBCP deactivation request. The server is configured to activate flow of data along with floor messages to a passive session, on receiving the MBCP activation request.

Accordingly the embodiments herein provide a User Equipment (UE) device comprising a memory and a processor coupled to the memory. The processor is configured to send one of a Media Bursts Control Protocol (MBCP) deactivation request and an MBCP activation request to a server.

Accordingly the embodiments herein provide a server comprising a memory and a processor coupled to the memory. The processor is configured to deactivate flow of data to an active session and retain floor messages to the active session, on receiving the MBCP deactivation request. The processor is configured to activate flow of data and floor messages to a passive session, on receiving the MBCP activation request.

These and other aspects of the example embodiments herein will be better appreciated and understood when considered in conjunction with the following description and the accompanying drawings. It should be understood, however, that the following descriptions, while indicating example embodiments and numerous specific details thereof, are given by way of illustration and not of limitation. Many changes and modifications may be made within the scope of the example embodiments herein without departing from the spirit thereof, and the example embodiments herein include all such modifications.

BRIEF DESCRIPTION OF THE DRAWINGS

Embodiments herein are illustrated in the accompanying drawings, throughout which like reference letters indicate corresponding parts in the various figures. The embodiments herein will be better understood from the following description with reference to the drawings, in which.

DETAILED DESCRIPTION

The embodiments herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. The examples used herein are intended merely to facilitate an understanding of ways in which the embodiments herein may be practiced and to further enable those of skill in the art to practice the embodiments herein. Accordingly, the examples should not be construed as limiting the scope of the embodiments herein.

Push-to-talk Over Cellular (PoC) is a push to talk (PTT) voice service which provides one-to-one and one-to-many voice communication service in a wireless cellular network.

The PoC session is a Session Initiation Protocol (SIP) session established between a PoC client and a home PoC server. The PoC client is a PoC functional entity that resides on the PoC User Equipment that supports the PoC service. The PoC server implements Third Generation Partnership Project (3GPP/3GPP2) IMS application level network functionality for the PoC service. The Mission Critical PTT (MCPTT) service is a PTT communication service which supports applications for Mission Critical Organizations and mission critical applications. The MCPTT service is a group communication service which involves fast setup times, high availability, reliability, and priority handling. The MCPTT service supports communication between several users in a group call where each user has permission to talk in an arbitrated manner. The MCPTT service also supports private calls between a pair of users. The MCPTT service builds on the existing 3GPP communication mechanisms for establishing, maintaining, and terminating communication path(s) among users.

Examples of situations where the MCPTT services are deployed are, but not limited to, natural disasters, terrorist attacks, and the like, where one or more responders may react to the situation. The MCPTT users belonging to one group can communicate within the group as well as communicate to other groups.

The example embodiments herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. The description herein is intended merely to facilitate an understanding of ways in which the example embodiments herein can be practiced and to further enable those of skill in the art to practice the example embodiments herein. Accordingly, this disclosure should not be construed as limiting the scope of the example embodiments herein.

The embodiments herein achieve methods and systems for optimizing network bandwidth consumption by dynamically controlling media bursts, when a user is participating a plurality of simultaneous Push to Talk over Cellular (PoC) sessions. Referring now to the drawings, and more particularly to FIGS. 1 through 9, where similar reference characters denote corresponding features consistently throughout the figures, there are shown example embodiments.

By way of example and not limitation, the embodiments herein are described with respect to Mission Critical Push to Talk (MCPTT) services. It is to be understood that the method and system is not limited to MCPTT services, but also to any simultaneous Push to Talk over Cellular network (PoC) services in general.

Figure 1:
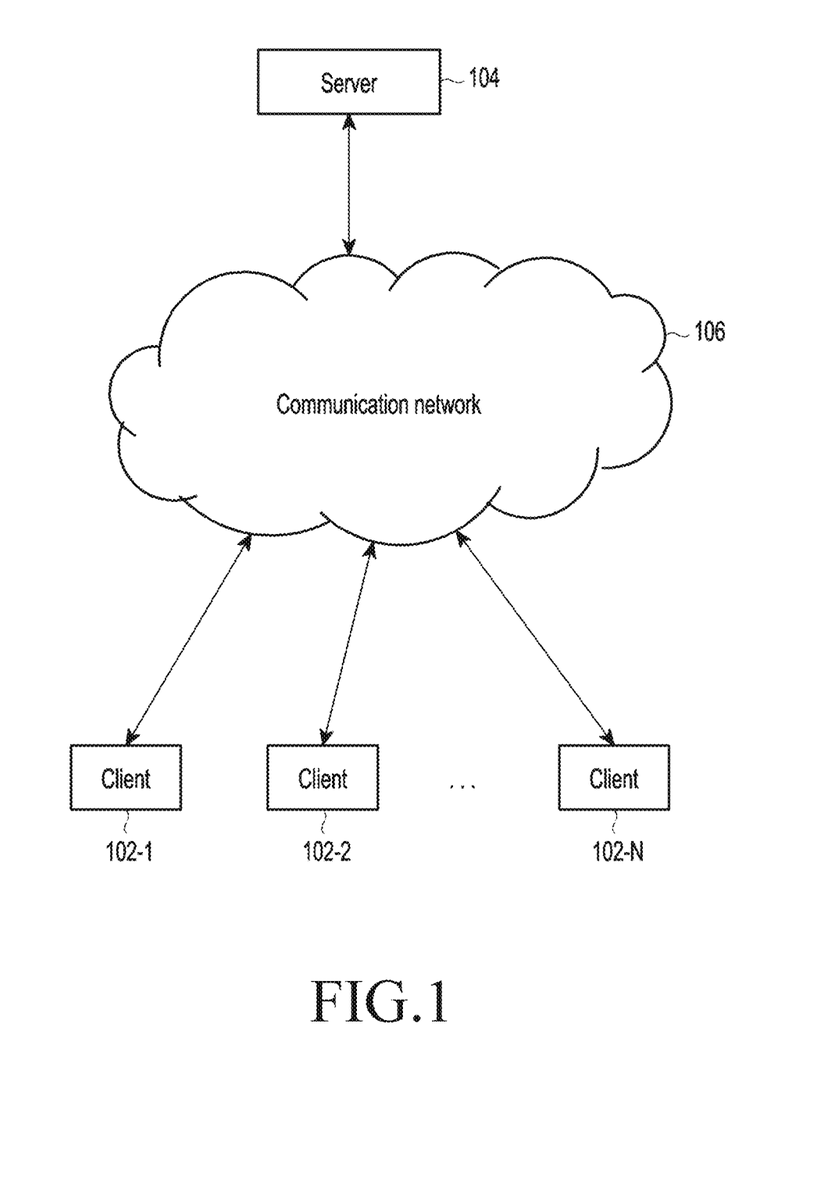
FIG. 1 illustrates a system for optimizing network resources in PTT services, according to embodiments as disclosed herein.

FIG. 1 illustrates a system 100 for optimizing network resources in PTT services. The system 100 comprises a plurality of clients or User Equipment (UE) devices 102-1, 102-2, . . . , 102-N. The terms "UE device", "client", "MCPTT client", and "PoC client" have been used interchangeably to refer to UE devices 102-1, 102-2, . . . , 102-N can be a cellular phone, a tablet, a laptop, two-way radio, smart phone, a mobile radio, and any other device capable of enabling a user to participate in a plurality of simultaneous PoC sessions. The plurality of the UE devices 102-1, 102-2, . . . , 102-N can communicate with a server 104 over a communication network 106. The server may be a PoC server, an MCPTT server, a PTT platform, and the like. The communication network 106 may comprise one or more components which are configured to provide wireless or wired network access, such as an enhanced base station eNodeB (eNB), a base station, a macro-cell, a femtocell, an access point, and the like. The communication network 106 can operate according to communication protocols such as long term evolution (LTE), LTE advanced (LTE-A), High Speed Packet Access (HSPA), and so on.

Figure 2:
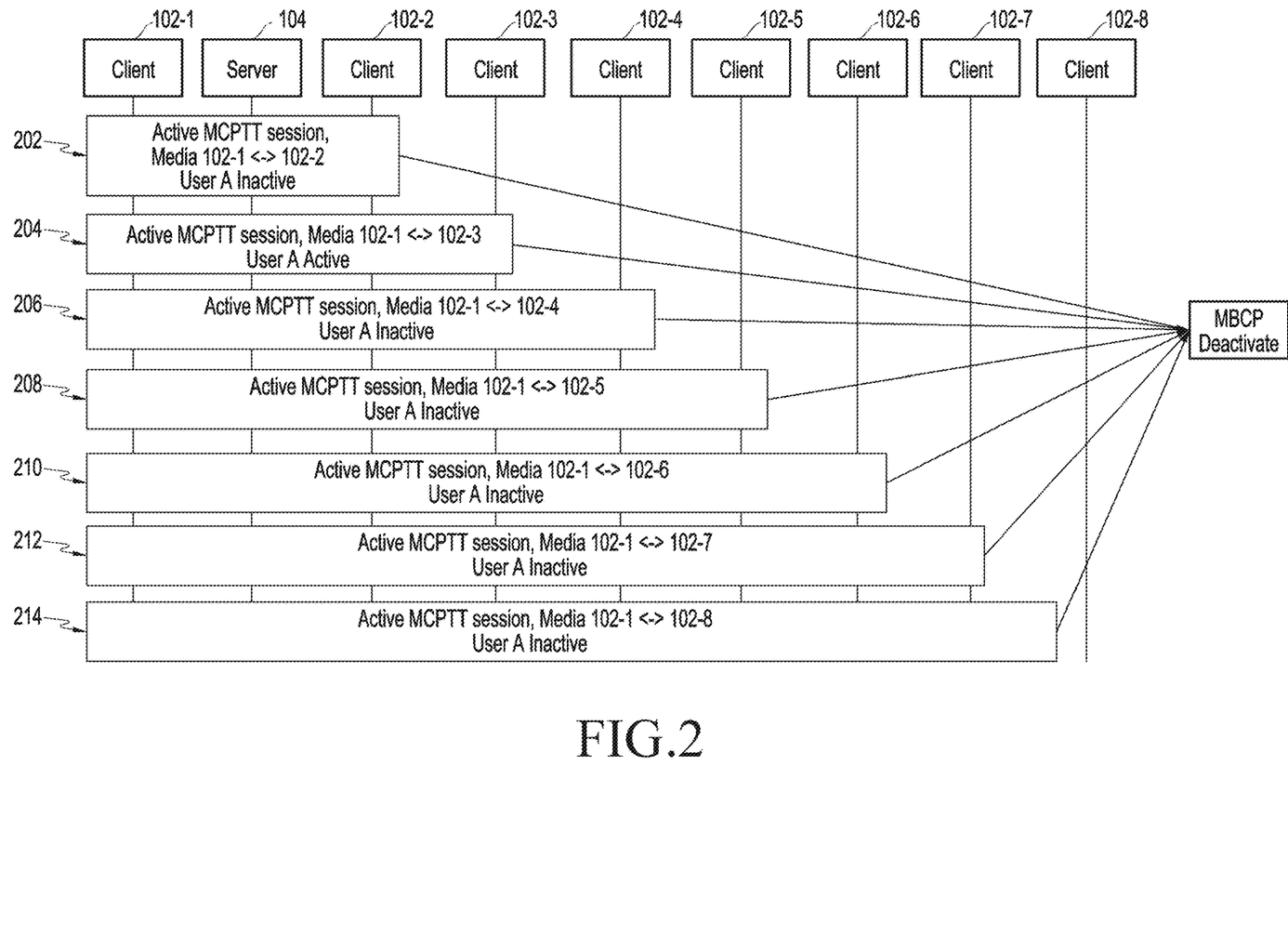
FIG. 2 illustrates an example scenario in which network resource optimization may be used, according to embodiments as disclosed herein.

FIG. 2 illustrates an example scenario in which network resource optimization may be used. FIG. 2 shows the UE devices 102-1, 102-2, 102-3, 102-4, 102-5, 102-6, 102-7, and 102-8 and the server 104. By way of example and not limitation, FIG. 2 shows a scenario with MCPTT clients and a server. In a PTT, or an MCPTT group call, only a single UE device can talk at a time, while the other UE devices in the MCPTT group call may listen to the talker. In FIG. 2, the UE device 102-1 is illustrated to be in communication with the other UE devices 102-2, 102-3, 102-4, 102-5, 102-6, 102-7, and 102-8, i.e., the UE device 102-1 is in a private call with the other UE devices. The control for talking can be obtained by an operation called a floor control. The floor control is exercised upon by floor participants and a floor control server (not shown). In the private call session, data can be exchanged between the UE device 102-1 and other UE devices 102-2, 102-3, 102-4, 102-5, 102-6, 102-7, and 102-8. During an active session, the UE device 102-1 may receive data from the other UE devices. Data may be, for example, one of a media, an audio, or a video.

However, the UE device 102-1 may have PoC session in one of active mode and passive mode. When the PoC session is in the active mode, the UE device 102-1 may be listening to, or recording the data. When the PoC session is in the passive mode, the data received from server 104 will be dropped in the device without processing.

In block 202, data is exchanged between the UE device 102-1 and the UE device 102-2 during an active session. When the session on UE device 102-1 is passive during data exchange, there is unnecessary wastage of network bandwidth resources. In this case, it is preferred that the data received from the UE device 102-2 is deactivated and not sent from Server 104 to UE device 102-1 instead of being dropped.

In block 204, in an active session, data is exchanged between the UE device 102-1 and the UE device 102-3. In this case, the UE device 102-1 is able to receive, and record the data from the server 104. The UE device 102-3 may have set the status to emergency.

In block 206, data is exchanged between the UE device 102-1 and the UE device 102-4 during an active session. Similar to block 202, since the session on the UE device 102-1 is passive during the data exchange, it is preferred that the data received from the UE device 102-4 is deactivated and not sent from the server 104 to the UE device 102-1, instead of being dropped.

Similar to block 204, in block 208, data is exchanged between the UE device 102-1 and the UE device 102-5. In this case, the UE device 102-1 is able to listen, record the data from the server 104.

In block 210, data is exchanged between the UE device 102-1 and the UE device 102-6 during an active session, when the UE device 102-1 is passive. Similar to block 202, since the session on the UE device 102-1 is passive during the data exchange, it is preferred that the data received from the UE device 102-6 is deactivated and not sent from the server 104 to the UE device 102-1, instead of being dropped.

Similar to block 204, in block 212, data is exchanged between the UE device 102-1 and the UE device 102-7. In this case, the UE device 102-1 is able to receive and, record the data from the server 104.

In block 214, data is exchanged between the UE device 102-1 and the UE device 102-8. Similar to the block 202, since the session on the UE device 102-1 is passive during the data exchange, it is preferred that the data received from the UE device 102-8 is deactivated and not sent from the server 104 to the UE device 102-1, instead of being dropped.

It is therefore preferred that any media flow for a passive session on UE device is deactivated. By deactivating the media, network resources can be conserved and may be used for another session. Deactivate request may be initiated by a user of a User Equipment (UE) device. The user may be, for example, a first responder and the UE device may be, for example, a mission critical push to talk (MCPTT) enabled device. Further, smart intelligence in the UE device may trigger both Activate and Deactivate operations. FIG. 2 is illustrated with respect to, but not limited to, MCPTT UE with simultaneous private calls. FIG. 2 may be applied to Group calls and to any other similar candidates.

Figure 3:
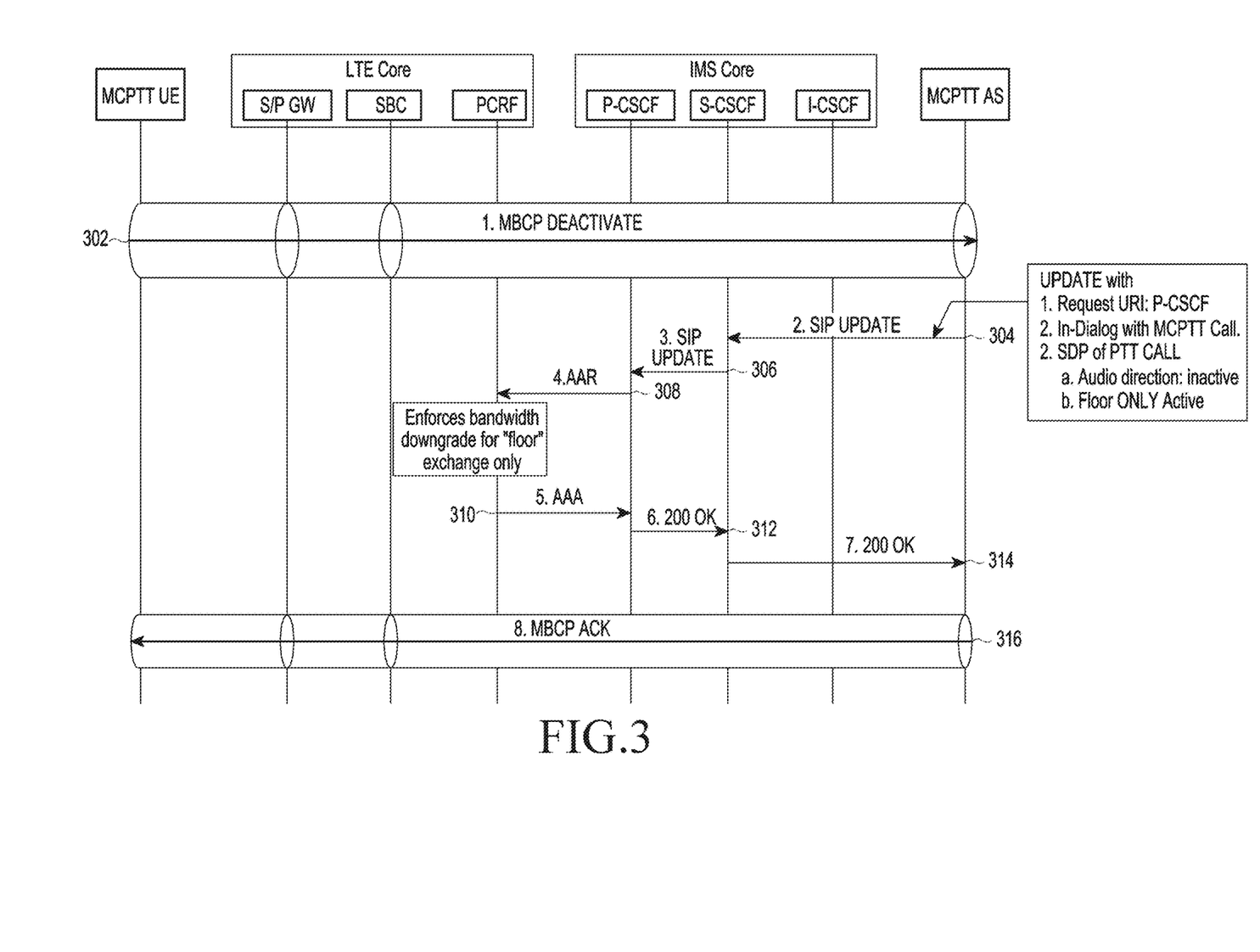
FIG. 3 illustrates a call flow for an MCPTT user-initiated deactivate, according to embodiments as disclosed herein.

FIG. 3 illustrates a call flow for an MCPTT user-initiated deactivate. At step 302, MCPTT UE device sends an Media Burst Control Protocol (MBCP) Deactivate request to an MCPTT Application Server (AS) for deactivating a bearer allocated for audio. Smart intelligence in the UE device enables the UE device to send the MBCP Deactivate request. Smart intelligence bundles various patterns using which an MCPTT client may perform the operation deactivation. At step 304, on receiving the deactivate request, the MCPTT AS transmits to a Serving Call Session Control Function (S-CSCF), Session Initiation Protocol (SIP) UPDATE information inside MCPTT Call, with Uniform Resource Identifier (URI) of request set to P-CSCF. Further, Session Description Protocol (SDP) is updated by rendering the audio direction as passive and activating only floor. At step 306, the SIP update is transferred from the S-CSCF to Proxy CSCF. At step 308, a Policy and Charging Rules Function (PCRF) of LTE core receives an AA-Request from the P-CSCF, and the UE device is enforced with a bearer bandwidth downgrade for "floor" exchange only. At step 310, after enforcing the bandwidth downgrade for the UE device, the PCRF sends an AA-Answer message to P-CSCF of the IMS core. In step 312, the P-CSCF routes the bandwidth downgrade message to Serving CSCF by way of 200 OK response, and at step 314, the S-CSCF sends the bandwidth downgrade message to the MCPTT AS by way of another 200 OK response. At step 316, the MCPTT AS sends an acknowledgment message to the UE regarding the media bursts deactivation.

The deactivation request may be sent by a user of the UE device to activate floor only and deactivate the other data, such as audio and video. The user can therefore selectively activate floor only for calls in a group call depending on the state of emergency of a callee. For example, the UE device may be in communication with a first responder in a fire group, and simultaneously, another group, such as a medical group may switch to emergency status. In this case, the UE can deactivate audio and other data from the first responder of the fire group and activate floor only for the fire group. In this way, the data is not completely dropped since the floor is accessible. On the other hand, the user of the UE device may also initiate an activate request.

Figure 4:
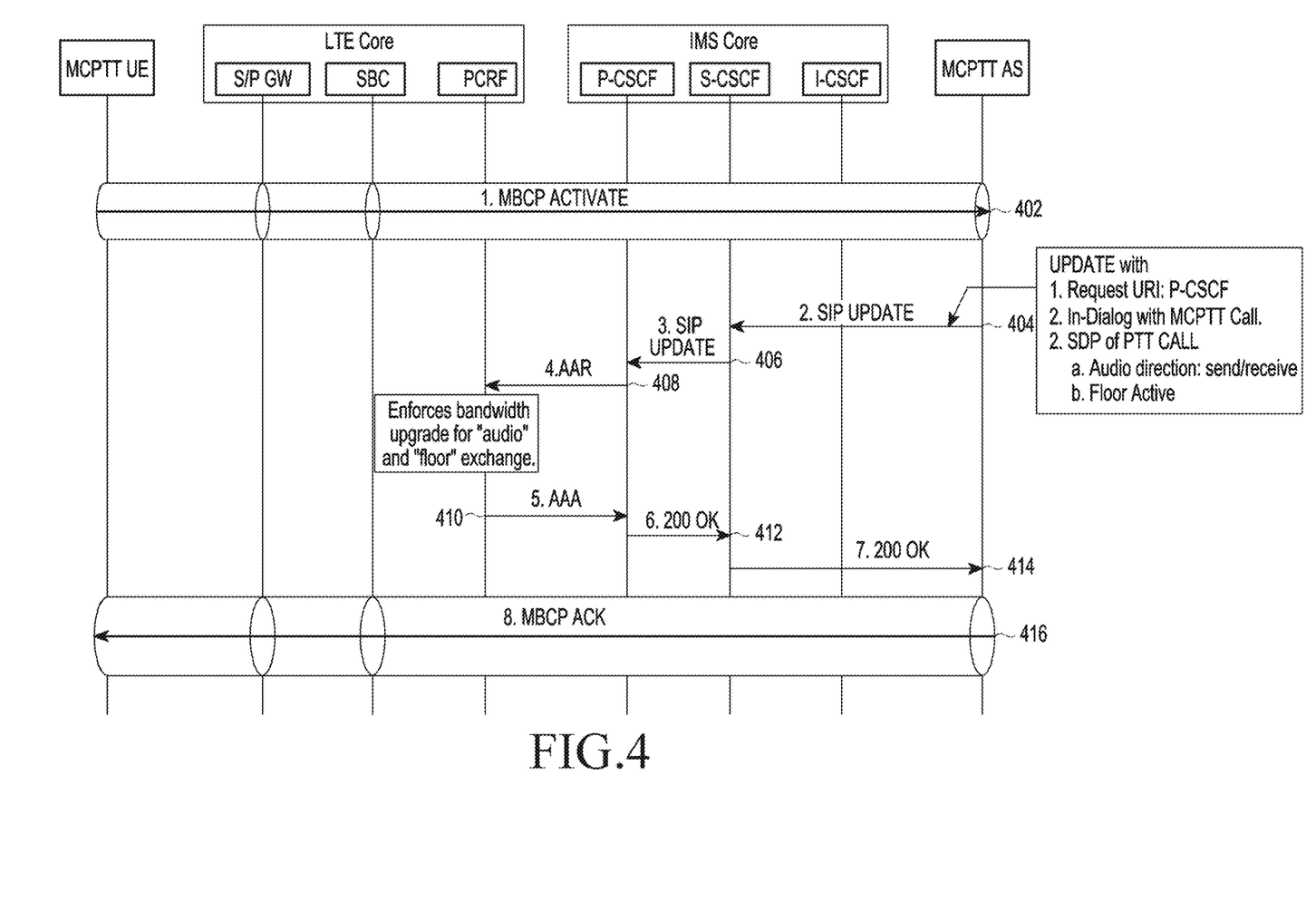
FIG. 4 illustrates a call flow for an MCPTT user-initiated activate, according to embodiments as disclosed herein.

FIG. 4 illustrates a call flow for an MCPTT user-initiated activate. At step 402, an MCPTT UE device sends a Media Burst Control Protocol (MBCP) Activate request to an MCPTT Application Server (AS) for activating a bearer allocated for audio. Smart intelligence in the UE device bundles various patterns using which an MCPTT client may perform the operation of activation. At step 404, on receiving the activate request, the MCPTT AS transmits to a Serving Call Session Control Function (S-CSCF), Session Initiation Protocol (SIP) UPDATE MESSAGE inside MCPTT call, with Uniform Resource Identifier (URI) of request set to P-CSCF. Further, Session Description Protocol (SDP) is updated by rendering the audio direction as send, or receive along with floor. At step 406, once the S-CSCF obtains the SIP UPDATE, the S-CSCF transfers the SIP UPDATE to Proxy CSCF. At step 408, a Policy and Charging Rules Function (PCRF) of LTE core receives an AA-Request from the P-CSCF, and the UE device is enforced with a bandwidth upgrade for audio and "floor" exchange. At step 410, after enforcing the bandwidth upgrade for the UE device, the PCRF sends an AA-Answer message to P-CSCF of the IMS core. In step 412, the P-CSCF routes the bandwidth upgrade message to Serving CSCF (S-CSCF) by way of 200 OK response, and at step 414, the S-CSCF sends the bandwidth downgrade message to the MCPTT AS by way of another 200 OK response. At step 416, the MCPTT AS sends an acknowledgment message to the UE regarding the media bursts activation.

Therefore, the user can selectively activate both data and floor by sending an activate request from the UE device. An Application server can also initiate an activate request. The server can initiate an activate request in situations where a group in the network, for example, changes the status to emergency.

Figure 5:
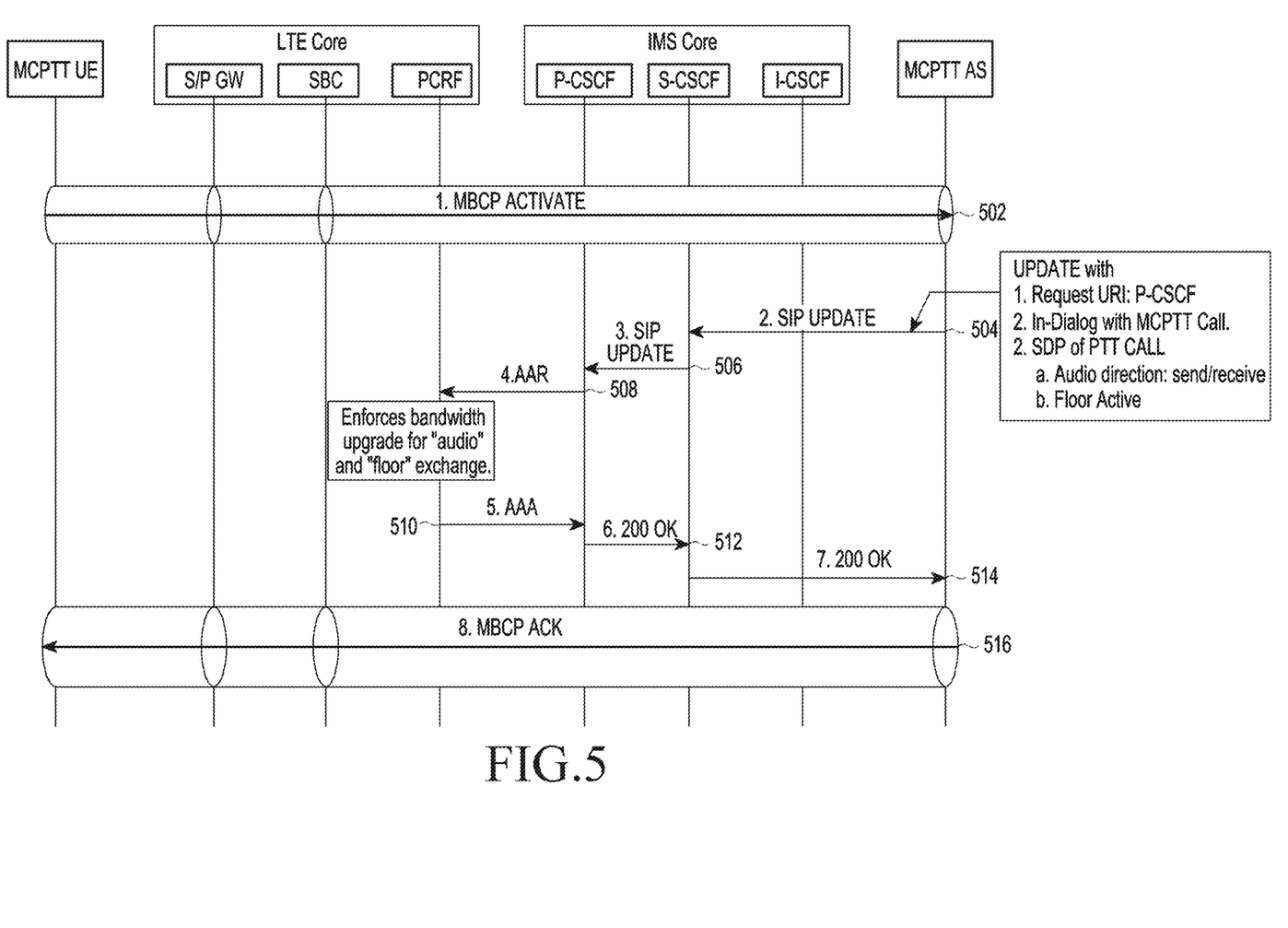
FIG. 5 illustrates a call flow for an MCPTT Application server (AS) initiated activate, according to embodiments as disclosed herein.

FIG. 5 illustrates a call flow for an MCPTT Application server (AS) initiated activate. At step 502, the MCPTT AS sends a Media Burst Control Protocol (MBCP) Activate request to an MCPTT UE for audio and floor exchange with optional indication of emergency. In example, when a MCPTT group, or a UE, changes its status from passive to emergency, the MCPTT AS can send the MBCP Activate request to the MCPTT UE, or the MCPTT group for audio and floor exchange. At step 504 the MCPTT AS sends a Session Initiation Protocol (SIP) UPDATE Message to the Serving Call Session Control Function (S-CSCF) inside MCPTT Call with Uniform Resource Identifier (URI) set to P-CSCF. Session Description Protocol (SDP) is further updated by updating the audio direction as send, or receive along with floor. At step 506, the S-CSCF transfers the SIP UPDATE to Proxy CSCF. At step 508, a Policy and Charging Rules Function (PCRF) of LTE core receives an AA-Request for enforcing a bandwidth upgrade for audio and "floor" exchange for the UE device. At step 510, after the bandwidth upgrade enforcement, the PCRF sends an AA-Answer message to P-CSCF of the IMS core. In step 512, the P-CSCF sends the bandwidth upgrade message to Serving CSCF by way of 200 OK response, and at step 414, the S-CSCF sends the bandwidth upgrade message to the MCPTT AS by way of the 200 OK response. At step 516, the MCPTT UE device sends an acknowledgment message to the MCPTT AS regarding the media bursts activation.

Figure 6:
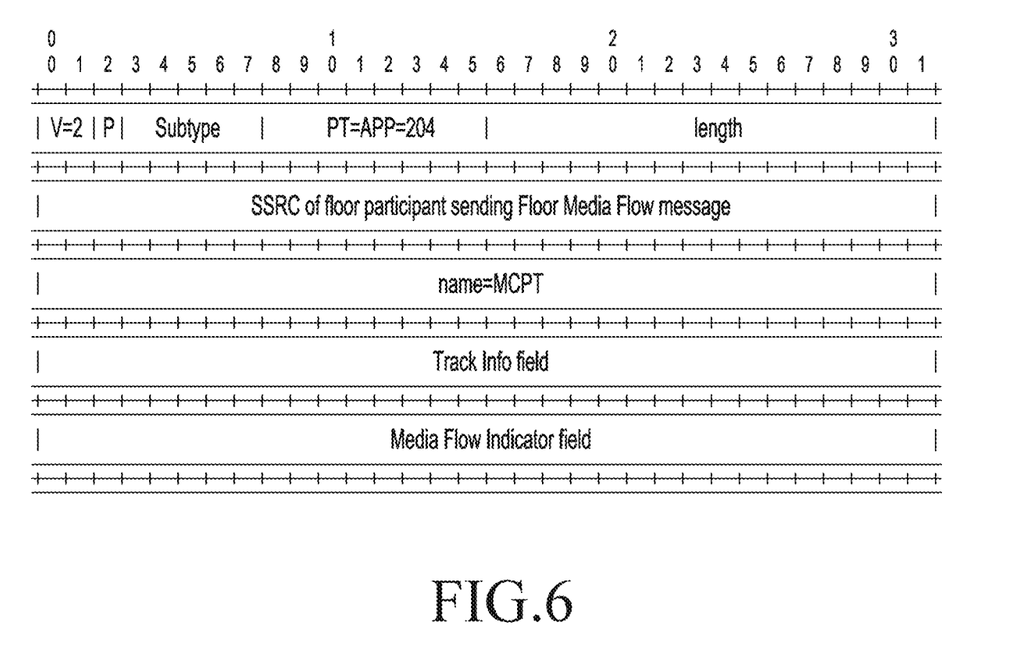
FIG. 6 illustrates an MBCP message format for floor media flow request according to the embodiments as disclosed herein.

FIG. 6 illustrates an MBCP message format for floor media flow request according to the embodiments herein. The floor media flow request message is a request from a floor participant to server to one of terminate and start sending media to the floor participant. The message is valid only when the floor participant does not have a floor grant to send media. The Floor media Flow Request message is only used in the on-network mode. The Floor Media Flow Request message is only used over an unicast bearer. Embodiments herein disclose a subtype X1011 that represents Floor Media Request. 'X' indicates whether or not a sender wants to have an acknowledgment for the MBCP Deactivate/Activate. If 'X' is 0, acknowledgement is not required, and if 'X' is 1, acknowledgement is required.

Figure 7:
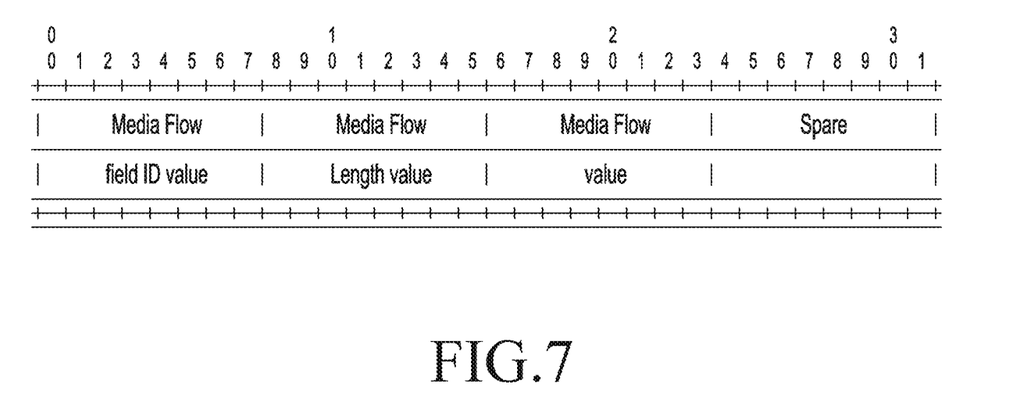
FIG. 7 represents a message format for flow media indicator field according to the embodiments as disclosed herein.

FIG. 7 represents message format for media flow indicator field, according to embodiments herein. The media flow indicator contains additional information about whether user wants to Deactivate/Activate media session. In FIG. 7, the Media Flow field ID value is a binary value and is set to 117 to indicate Activate/Deactivate. The Media Flow length value is a binary value and has the value '2'. The Media flow value is an 8-bit binary value where '0' means that the floor participant in the MCPTT client wants media to be deactivated and '1' means that the floor participant in the MCPTT client wants media to be activated. As illustrated in FIG. 5, when a group changes its status to emergency, the MCPTT AS sends a MBCP activation request to the UE for audio and floor messages. In an example, a user may be in a communication with group A which may be active, and a group B may change its status to emergency. In this case, the MCPTT Application Server (AS) shall send the message with '1' in the media flow value for the group B. This procedure activates the session for the group B with the user.

In another example, if the user wishes to switch the communication with another group, for example, group C, then the user can send 1 in the media flow value for the group C, and can send zero in the media flow value for the current group that the user is communicating with.

Figure 8:
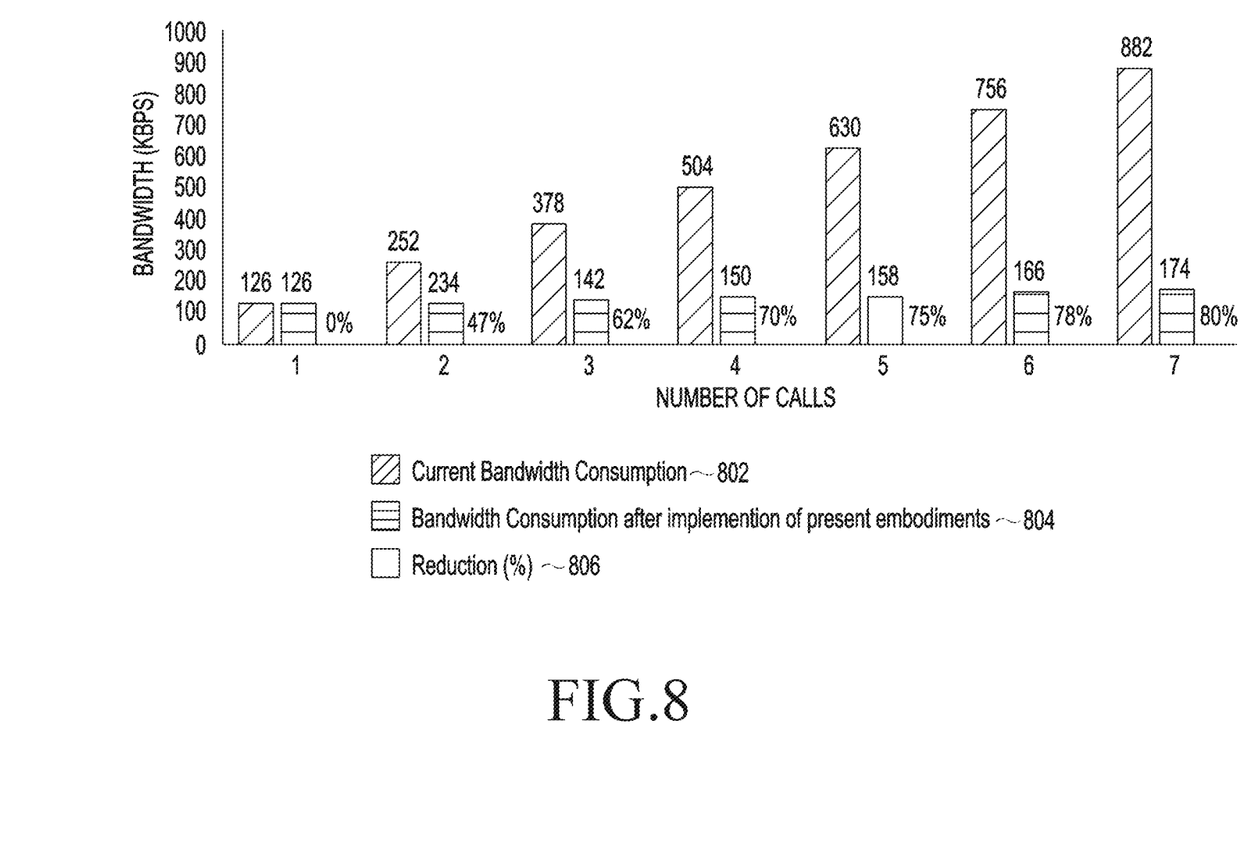
FIG. 8 illustrates a comparison between the existing bandwidth consumption data and the bandwidth consumption in accordance with the embodiments as disclosed herein.

FIG. 8 illustrates a comparison between the existing bandwidth consumption data 802 and the bandwidth consumption in accordance with the embodiments herein 804. FIG. 8 also illustrates reduction in the bandwidth consumption 806. Number of calls is given as a sum total of private calls and group calls. In MCPTT, typically the calls are group calls. In FIG. 8, x axis is the number of calls and y axis is the corresponding bandwidth that a UE device requires with the number of calls. In an example, 126 kbps is required for a call that involves both audio and floor. When the number of calls is 2, the current bandwidth consumption would be 252 kbps. In contrast to the existing technique, the value according to the embodiments herein is 134 kbps, which is a sum total for audio call, which is 126 kbps and 8 kbps for a floor message. Therefore, there is a 47% decrease in bandwidth consumption. As the calls increase, the gain on the network bandwidth also increases as shown in FIG. 8. When the number of calls is seven, an 80% optimization is obtained.

Figure 9:
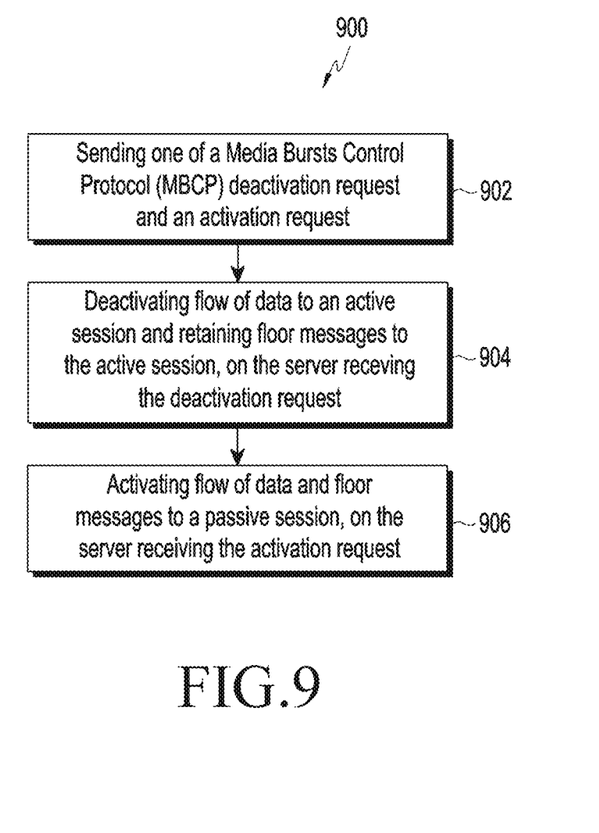
FIG. 9 illustrates a method for optimizing network resources in Push to Talk over Cellular (PoC) service.

FIG. 9 illustrates a method for optimizing network resources in Push to Talk over Cellular (PoC) service in a user plane. At block 902, a User Equipment (UE) device sends one of a Media Bursts Control Protocol (MBCP) deactivation request and an activation request to a server. At block 904, the server deactivates flow of data to an active session and retaining floor messages to the active session, on receiving the deactivation request, the data being one of audio and video. On sending the MBCP deactivation request, the server 104 to deactivates the active session and activates the passive session, only when a floor is allocated to one of a user and one or more interested users in a group, in case of multi-talker feature. For retaining the floor messages to the active session, the server moves a floor state to a paused state, "U:PAUSED" and communicates to core network to reduce bandwidth for exchanging floor messages. The MBCP deactivation request indicates a request from the UE to the server 104 for terminating the flow of data to the UE device. At block 906, the server activates flow of data and floor messages to a passive session, on the server receiving the activation request. The server 104 communicates to the core network to increase bandwidth to exchange the data and floor messages, on sending the MBCP activation request. The server (104) sends the MBCP activation request to the UE for audio and floor exchange for a passive session in one of an emergency situation and when any interested user has taken a floor successfully.

The various actions in method 900 may be performed in the order presented, in a different order or simultaneously. Further, in some embodiments, some actions listed in FIG. 9 may be omitted.

The embodiments herein can help scale up the number of calls for a given bandwidth. It is very crucial in mission critical services that there is enough bandwidth to accommodate as many calls as possible during an emergency scenario. The embodiments herein achieve network optimization where a single network can accommodate more number of calls that can aid more human life.

Embodiments herein results in availability of active sessions information per PoC User at the PoC Server which can be used for extended use cases by the PoC Server/Authorized User. For e.g. the Authorized PoC User can request to Deactivate a particular PoC session and indicate PoC Server to Activate, only when the floor is taken by a particular PoC User or in case of Multi-talker feature when a set of desired PoC User(s) take floor in the group.

The embodiments disclosed herein are not restricted only to on-network scenarios, but applicable to off-network scenarios for e.g in Mission Critical Off-network MCPTT/MCVideo services.

The embodiments disclosed herein are not restricted only to over Cellular, but applicable to ePDG scenarios.

The embodiments disclosed herein can be implemented through at least one software program running on at least one hardware device and performing network management functions to control the elements. The elements shown in FIG. 1 can be at least one of a hardware device, or a combination of hardware device and software module.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of embodiments, those skilled in the art will recognize that the embodiments herein can be practiced with modification within the spirit and scope of the embodiments as described herein

The invention claimed is:

1. A method performed by a server in a wireless communication system, comprising:
  receiving a Media Bursts Control Protocol (MBCP) deactivation request from a User Equipment (UE) in an active session;
  deactivating flow of data to the UE and retaining floor messages to the UE, in response to receiving the MBCP deactivation request, wherein the data is one of audio and video;
  receiving an MBCP activation request from the UE in a passive session; and
  activating flow of data to the UE, in response to receiving the MBCP activation request.

2. The method of claim 1, wherein retaining the floor messages to the UE comprises:
  moving a floor state to a paused state; and
  communicating to core network to reduce a bandwidth for exchanging the floor messages.

3. The method of claim 2, wherein moving the floor state to the paused state comprises moving the floor state to "U:PAUSED".

4. The method of claim 1, wherein, the method further comprises communicating to a core network to increase a bandwidth to exchange the data and the floor messages, in response to receiving the MBCP activation request.

5. The method of claim 1, wherein the MBCP deactivation request comprises a floor request message indicating a request from the UE to the server for terminating the flow of data to the UE.

6. The method of claim 1, wherein, sending the MBCP deactivation request comprises requesting the server to deactivate the active session and activate the passive session, only when a floor is allocated to one of a user and one or more interested users in a group, in case of multi-talker feature.

7. The method of claim 6, further comprising:
  sending the MBCP activation request to the UE for audio and floor exchange for a passive session in one of an emergency situation or when any of the one or more interested users takes the floor successfully.

8. A server in a wireless communication system, comprising:
  a transceiver; and
  at least one processor coupled to the transceiver, wherein the at least one processor is configured to:
    receive a Media Bursts Control Protocol (MBCP) deactivation request from a User Equipment (UE) in an active session;
    deactivate a flow of data to the UE and retain floor messages to the UE, in response to receiving the MBCP deactivation request;
    receive an MBCP activation request from the UE in a passive session; and
    activate flow of data along with floor messages to the UE, in response to receiving the MBCP activation request.

9. The server of claim 8, wherein in retaining the floor messages to the UE, the processor is further configured to:
  move a floor state to a paused state; and
  communicate to core network to reduce a bandwidth for exchanging the floor messages.

* * * * *